United States Patent [19]

Djabbarah et al.

[11] Patent Number: 5,295,540
[45] Date of Patent: Mar. 22, 1994

[54] FOAM MIXTURE FOR STEAM AND CARBON DIOXIDE DRIVE OIL RECOVERY METHOD

[75] Inventors: Nizar F. Djabbarah, Richardson; Ralph V. Garling, Irving, both of Tex.

[73] Assignee: Mobil Oil Corporation, Fairfax, Va.

[21] Appl. No.: 976,638

[22] Filed: Nov. 16, 1992

[51] Int. Cl.⁵ .................... E21B 43/22; E21B 43/24
[52] U.S. Cl. .................... 166/272; 166/268; 166/373; 166/274; 166/309; 252/8.554
[58] Field of Search ............... 166/268, 272, 273, 274, 166/275, 303, 309; 252/8.554

[56] References Cited
U.S. PATENT DOCUMENTS

| | | | |
|---|---|---|---|
| 3,530,940 | 9/1970 | Dauben et al. | 166/309 X |
| 3,637,021 | 1/1972 | Hutchison et al. | 166/57 X |
| 4,911,238 | 3/1990 | Lau et al. | 166/268 X |
| 5,046,560 | 9/1991 | Teletzke et al. | 166/268 X |
| 5,074,358 | 12/1991 | Rendall et al. | 166/268 X |
| 5,105,884 | 4/1992 | Sydansk | 166/272 X |
| 5,129,457 | 7/1992 | Sydansk | 166/268 X |
| 5,193,618 | 3/1993 | Loh et al. | 166/272 |

Primary Examiner—George A. Suchfield
Attorney, Agent, or Firm—Alexander J. McKillop; George W. Hager, Jr.; Lawrence O. Miller

[57] ABSTRACT

The invention is a foam method for improving conformance during a steam flood or carbon dioxide flood in a subterranean, oil-containing formation penetrated by at least one injection well and at least one production well. In a steam flood oil recovery process, sweep efficiency is improved by injecting steam until steam breakthrough occurs at the production well after which a mixture of steam, a noncondensible gas, and an aqueous surfactant-starch solution is injected into the formation. The aqueous surfactant-starch solution forms a stable foam with the formation oil at formation conditions that reduce the permeability of the highly permeable steam swept zones thereby diverting the steam to other portions of the formation containing unswept oil. The starch is used as a partial substitute for the surfactant to improve the cost of the foam-forming mixture without reducing its effectiveness in increasing sweep efficiency.

50 Claims, 3 Drawing Sheets

FOAM MIXTURE FOR STEAM AND CARBON DIOXIDE DRIVE OIL RECOVERY METHOD

FIELD OF THE INVENTION

This invention relates to an oil recovery process such as steam or carbon dioxide flooding for oil-containing formations in which the sweep efficiency of the steam or carbon dioxide is improved significantly by generating a foam using an aqueous surfactant-starch solution as the foaming agent that produces a more stable foam in the steam or carbon dioxide swept zone in the formation that reduces the permeability of the steam or carbon dioxide swept zone thereby enabling subsequently injected steam or carbon dioxide to migrate into additional portions of the formation containing unswept oil.

BACKGROUND OF THE INVENTION

The injection of steam to recover oil from heavy oil formations is an accepted method in the industry and accounts for nearly 80% of total U.S. enhanced oil recovery. Past experiments and field performance have shown the improved displacement efficiency of heavy oils by reduction in viscosity of the oil by a heated displacing phase. Displacement of oil increases with increasing temperature. Despite its success, it typically leaves behind 30-40% of the original oil in place. One reason is reservoir heterogeneities which, together with relatively low density and viscosity of steam, causes rapid communication between injector and producer wells. The result is reduced sweep efficiency and lower oil recovery.

Steam is considerably lighter than the oil and water present in the formation and thus, because of gravity segregation, it tends to rise to the top of the formation when vertical communication exists. Consequently, the injected steam channels through the top of the formation to the producing well overriding a major portion of the formation and contacting only a small fraction of the formation oil. Once steam override has begun, continued injection of steam into the formation will accomplish very little additional oil recovery. This behavior results in an inefficient oil recovery and low vertical sweep efficiency.

A similar conformance problem exists with carbon dioxide flooding. Carbon dioxide has a great tendency to channel through oil-in-place since carbon dioxide viscosity may be 10 to 50 times lower than the viscosity of the oil-in-place.

Laboratory and field test results have demonstrated that foam may be used to improve sweep efficiency. In steam flooding, the process is referred to as steamfoam. A typical steamfoam process involves coinjection of a small amount of surfactant with steam or with a noncondensible gas, such as nitrogen and steam. The steam vapor, or the nitrogen and the steam vapor disperses in the surfactant solution and generates foam. Because of its gas-like density, foam tends to override the steam and enter the more permeable and the well swept zones. Because of its high viscosity, it flows at a slower rate and allows steam to be diverted to the unswept zones with high oil saturation. The diverted steam contacts the oil and recovers it. A typical steamfoam process involves the injection of 0.2-1% weight surfactant in the liquid phase and 0.1-2 mole percent nitrogen in the gas phase.

In addition, numerous patents have been issued on the recovery of oil using a foam-forming mixture of steam, noncondensible gas and surfactant which includes U.S. Pat. Nos. 4,086,964; 4,488,598; 4,570,711; 4,852,653 and 4,971,150.

U.S. Pat. 4,607,695 discloses a steamfoam process in which steam is injected into the formation having a natural brine salinity concentration within the range of 10 to 20% by weight until steam breakthrough occurs at the production well after which a mixture of steam, a noncondensible gas, and a surfactant comprising a $C_{12}$ alpha olefin sulfonate is injected into the formation. The $C_{12}$ alpha olefin sulfonate forms a stable foam with the formation oil at formation conditions that reduces the permeability of the highly permeable steam swept zones thereby diverting the steam to other portions of the formation containing unswept oil.

The present invention provides an improved method for recovering oil from an oil-containing formation utilizing an aqueous surfactant-starch solution mixed with carbon dioxide or with steam and a noncondensible gas that stabilizes the foam effecting a reduction in permeability of steam-swept or carbon dioxide-swept channels thereby enabling subsequently injected steam or carbon dioxide to migrate into additional portions of the formation containing unswept oil. The use of an aqueous mixture of surfactant and starch as the foam-forming mixture produces a stable foam and also results in a reduced amount of surfactant without reducing the effectiveness of the surfactant.

SUMMARY

The present invention relates to a steam or carbon dioxide flooding method for recovering oil from a subterranean, oil-containing formation penetrated by at least one injection well and at least one spaced-apart production well, said wells being in fluid communication with a substantial portion of the formation. In the case of steamflooding, steam is injected into the formation and fluids including oil are produced from the formation via the production well for a predetermined period of time, preferably until the establishment of thermal communication between the injector and the producers. Thereafter, a mixture of steam, a noncondensible gas, and an aqueous solution of surfactant-starch is injected into the formation via the injection well, said aqueous surfactant-starch solution capable of forming a stable foam with residual oil in the steam-swept zone at formation conditions of temperature and pressure thereby significantly decreasing the permeability of that zone and diverting the steam into other portions of the formation and continuing to inject said mixture of steam and aqueous surfactant-starch and recovering fluids including oil from the formation solution via the production well. The noncondensible gas and aqueous surfactant-starch solution may be injected into the formation without the concurrent injection of steam provided that steam is injected into the formation prior to and after the injection of the noncondensible gas and aqueous surfactant-starch solution. In the case of carbon dioxide flooding, the flooding medium itself preferably doubles as the non-condensable gas.

DESCRIPTION OF THE PREFERRED EMBODIMENTS

The process of our invention concerns an improvement in a steam or carbon dioxide flooding type of oil recovery method in a subterranean, oil-containing formation using an aqueous surfactant/starch foaming agent. In a steamflood, the method involves injecting a mixture of steam, a noncondensible gas, and an aqueous surfactant-starch solution that forms a stable foam in the steam-swept channels of the formation at formation conditions of temperature and pressure thereby plugging the previously steam-swept channels so that the injected steam will be forced to pass through unswept oil sections of the formation. The presence of the low cost starch in the foam-forming mixture improves stabilization of the foam and also reduces the amount of high cost surfactant required in the solution without reducing the effectiveness of the surfactant thereby resulting in a more economical process.

Figure 1:
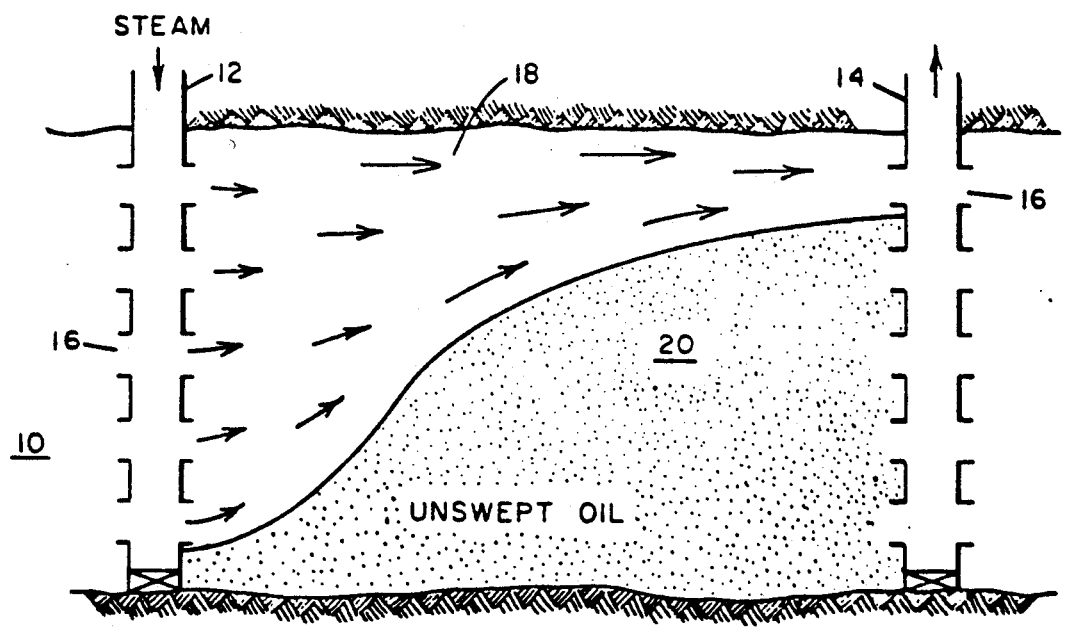
FIG. 1 illustrates a vertical plan view of a subterranean, oil-containing formation penetrated by an injection well and a production well completed subsequently throughout the formation, illustrating how initial injection of steam migrates to the upper portions of the formation, thus overriding and bypassing a significant amount of oil in the lower portion of the formation.

The process of our invention is best understood by referring to the attached figures, in which FIG. 1 illustrates how an oil-containing formation 10 is penetrated by an injection well 12 and a production well 14. When using steam flooding, steam is initially injected into injection well 12, passes through perforations 16, and then into the formation 10. Conventional practice is to perforate or establish fluid flow communications between the well and the formation throughout the full vertical thickness of the formation, both with respect to injection well 12 and production well 14. The injected steam heats the oil reducing its viscosity and displaces the mobilized oil through the formation 10 toward production well 14 from which it is recovered. Although steam is injected in the full vertical thickness of the formation, it can be seen that steam migrates both horizontally and in an upward direction as it moves through the formation between injection well 12 and production well 14. Once a portion of the formation 18 has been swept by steam passing horizontally through the formation to at least one of the perforations 16 of producing well 14, the problem of premature steam breakthrough is recognized. Since the hydrocarbons have been removed from the portions of the pore spaces of swept zone 18, the permeability to steam is much greater in zone 18 that it is in the lower undepleted portion 20 of the formation 10. Once the high permeability swept zone 18 has been established connecting injection well 12 and production well 14, further injection of steam into the formation will result in steam passing only through zone 18 and consequently displacing very little additional viscous oil from that portion 20 of the formation through which very little of the steam passes causing the overall recovery efficiency from the extra recovery zone to be very low. Referring to FIG. 1, the portion 18 of the first step represents an ever decreasing portion of the vertical thickness of the formation as the steam travels between the injection well 12 and production well 14.

Figure 2:
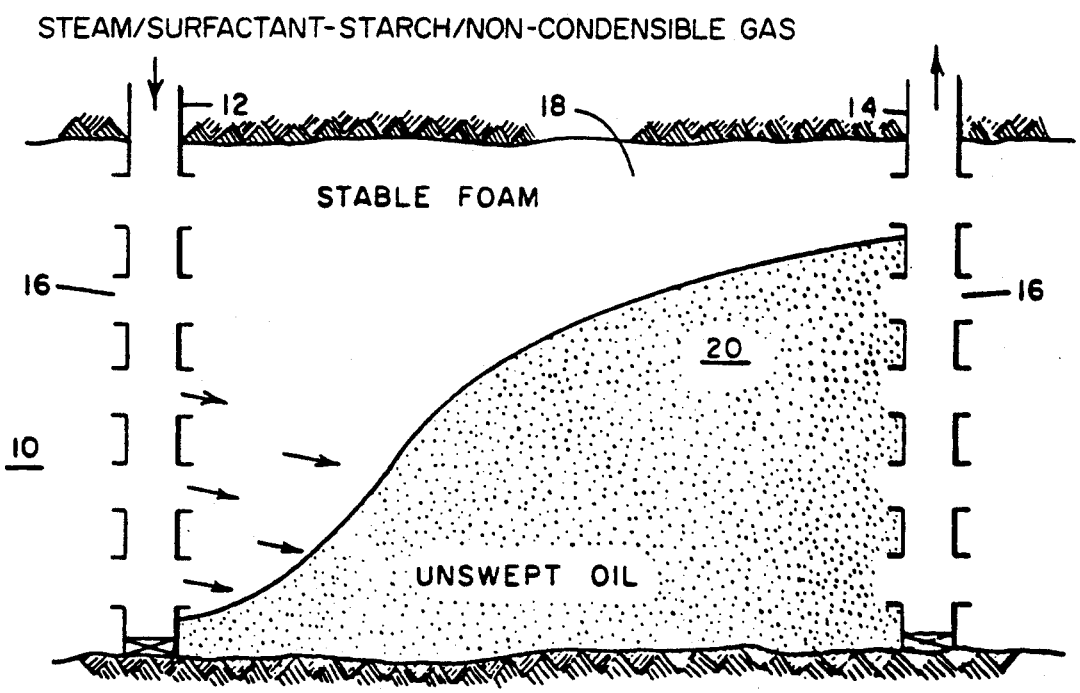
FIG. 2 illustrates the second step of our process wherein a mixture of steam, a noncondensible gas and a surfactant-starch mixture is injected into the steam-swept zone that forms a stable foam with the formation oil under formation conditions of temperature and pressure thereby decreasing the permeability of that zone and causing the injected steam to migrate into the lower portion of the formation containing unswept oil.

The second step in the process of our invention is initiated once thermal communication has been established between the injection well 12 and the production well well 14 after which a mixture of steam, a noncondensible gas, and an aqueous surfactant solution containing starch, preferably corn starch, is injected into the formation via injection well 12 and fluids including oil are continued to be recovered from the formation 10 via production well 14 as illustrated in FIG. 2. The noncondensible gas is preferably nitrogen, but can comprise other substantially inert gases such as air, $CO_2$, flue gas, natural gas, methane, ethane, carbon monoxide or any mixture thereof. The surfactant used in this invention is a water-soluble anionic surfactant. The surfactants useful in the steamfoam application of the present invention include alkylaryl, alpha olefin sulfonates (AOS) and dimerized alpha olefin sulfonates and the petroleum sulfonates derived from sulfonation of petroleum oils or petroleum oil fractions. Normally linear toluene sulfonates will be preferred in a steamfoam process since they are chemically stable at steamflood conditions. Useful commercially available steamfoam surfactants include those sold under the trade names "SUN TECH IV" sold by Sun Refining and Marketing Company, "ENORDET LTS18" sold by Shell Chemical Company, "STEPHANFLO 80" sold by Stepan Chemical Company, "SIPONAATE A-168" sold by Alcolas International, Inc., "ENORDET AOS 1618" sold by Shell Chemical Company and "CHASER SD1000" and "CHASER SD1020" sold by Chevron Chemical Company. The most preferred surfactant is "CHASER SD1020."

The surfactants useful in the gas-drive application of this invention also include anionic surfactants such as lower chain-length alpha olefin sulfonates ($C_6$–$C_{14}$) and ammonium or sodium salts of ethoxylated sulfated alcohols and nonionic surfactants such as linear alcohol ethoxylates, which are the products of the reaction of a linear alcohol with ethylene oxide. The most preferred surfactant in the gas-driven application is an ammonium salt of ethoxylated sulfated alcohol marketed by GAF Corporation under the trade name "ALIPAL CD-128."

The starch is mixed with an aqueous surfactant solution. The weight ratio of surfactant to starch is about 1:10 to 10:1, preferably about 1:1, depending on reservoir properties and process economics. The surfactant and starch are mixed until the starch is dissolved. The aqueous surfactant-starch solution is coinjected with the steam and noncondensible gas. The foaming mixture contains about 20 to about 100, preferably about 40 to about 60 standard cubic feet of a non-condensible gas per barrel of steam (cold water equivalent). The concentration of surfactant in the mixture of steam, noncondensible gas and aqueous surfactant-starch solution is about 0.1% to about 5%, preferably about 0.35% by weight of the liquid phase of the steam (cold water equivalent).

Referring to FIG. 2, the injected mixture of steam, noncondensible gas and aqueous surfactant-starch solution passes into the steam swept zone 18 and as the aqueous surfactant-starch solution is displaced through the steam swept zone 18 it creates a stable foam in that portion of the formation that significantly decreases the permeability of that zone. The presence of starch in the injected aqueous surfactant-starch solution stabilizes the foam films (lamellae), reduces the tendency of the film to rupture, increases flow resistance, and diverts the steam into zone 20 of the formation containing unswept oil. By itself, starch is insoluble in water but is solubilized by the surfactant in the aqueous solution. The starch and surfactant absorb at the surface of the foam films where they form molecular complexes and render the foam lamellae more stable. As the foam propagates in the reservoir, the starch is preferentially adsorbed on the rock surface, thereby reducing surfactant loss due to adsorption thereby allowing more surfactant to propagate further into the formation to increase flow resistant in the steam swept zones. The low cost starch acts as a preferential or sacrificial agent therefore making the process more economical by reducing the amount of high cost surfactant required in the foam-forming mixture without reducing the effectiveness of the surfactant. For example, surfactants currently costs about $1.75–2.00 per active pound whereas starch only costs about $0.25 per pound.

The injection rate of the mixture of steam, noncondensible gas and surfactant/starch mixture depends on the design of original steam flood. For an 80–100 foot thick reservoir zone, typical injection rates are 650 barrels of steam per day, on a cold water equivalent basis, 17 gallons/HR surfactant-starch mixture and 20 standard cubic feet per minute nitrogen.

Continued injection of the mixture of steam, noncondensible gas, and surfactant-starch mixture results in additional formation of the stable foam that selectively decreases the permeability of the high permeability steam swept zone thereby causing steam to pass into zone 20 in the lower portion of the formation below zone 18 containing unswept oil which increases the vertical thickness of the formation swept by steam. Injection of the steam-gas-surfactant-starch mixture and production of oil is continued until steam breakthrough occurs as the production well 14 or until the water cut of the fluid being produced reaches an unfavorable value, preferably at least 95 percent.

In another embodiment of the process of our invention, the aqueous solution of surfactant and starch is heated to at least the swelling temperature of the starch but below its gelatization temperature and then the mixture is coinjected with nitrogen and steam. In a preferred embodiment, equal weights of surfactant, preferably Chaser SD 1020, and corn starch are mixed in an aqueous solution and heated to 70° C. to permit it to swell and then the mixture is coinjected with nitrogen and steam.

The noncondensible gas and aqueous surfactant-starch solution may be injected into the formation without the concurrent injection of steam, provided that steam is injected into the formation prior to and after the injection of the noncondensible gas and aqueous surfactant-starch solution. But preferably, the steam is coinjected with the noncondensible gas and aqueous surfactant-starch solution.

In accordance with the invention, the temperature of the injected steam is maintained in excess of 400° F., and preferably at temperatures in the range of 400°–500° F. The quality of the steam is within the range of 40 to 60%.

As used in the specification and appended claims the term "starch" includes the corn, rice, wheat, arrowroot, tapioca, sago and potato starches; the commercially available pre-oxidized corn starches, both the pearl and food grades sold under various trade names like "STAYCO", "NATIONAL", "HERCULES", "NALEX", "ABINCO" and the like which are generally prepared by hypochlorite oxidation of corn starch, as well as mixtures of such starches. Such starches are disclosed in U.S. Pat. Nos. 3,493,561 and 3,724,548, completely incorporated herein by reference.

In the case of carbon dioxide flooding the carbon dioxide itself preferably doubles as the non-condensible gas.

The foam-forming mixture of steam, noncondensible gas and aqueous surfactant-starch solution or mixture of carbon dioxide and aqueous surfactant-starch solution can bring about a substantial reduction in permeability when injected in the high permeability areas of the formation at almost any time. Conformance will be significantly improved whether the foam-forming mixture is injected into the formation at the very beginning of steam or carbon dioxide injection, before steam or carbon dioxide breakthrough at the production well, or after breakthrough. The most preferred injection times occur after the establishment of thermal communication between the injector and the producer. In the first instance the injection of foam-forming mixture near the beginning of injection will help prevent narrow channels solution from being formed and being extended through to the production wells. The injection of the foam-forming mixture prior to breakthrough will postpone the time of breakthrough and spread the flooding medium over a wider area near the production wells.

In the case of carbon dioxide flooding, the concentration of surfactant in the mixture is about 0.1% to about 5%, preferably about 0.35% by weight of aqueous surfactant solution.

The following examples will further illustrate the novel foam-forming mixtures of the present invention. These examples are given by way of illustration and not as limitations on the scope of the invention. Thus, it should be understood that the composition and concentration of the foaming agents may be varied to achieve similar results within the scope of the invention.

EXAMPLES

The following examples demonstrate how effective starch is when used as a partial substitute to a steam-foam surfactant such as "CHASER" SD1020".

Two sets of flow experiments were conducted with two types of porous media: the first set was conducted to evaluate the ability of the mixture to propagate and generate foam. The second experiment was used to determine the ability of the foam generated by the surfactant-starch mixture to divert steam and increase oil production.

The experiments were conducted in laboratory sandpacks using a typical California reservoir crude oil and steam generator feedwater. The experiments were conducted at simulated steamflood conditions of 400° F. and 320 psi.

EXAMPLE 1

This example demonstrates that a starch additive can be used, in steamfoam oil production processes, as a partial substitute to a surfactant resulting in lower surfactant concentration without reducing its effectiveness. The experiments were conducted in a 5 ft. long × 1.73 in diameter stainless steel pipe packed with quartz sand. The sandpack had a permeability of 8 darcies and a pore volume (PV) of 960 cc. It was filled with 860 cc of California heavy oil, 13 API gravity, and 100 cc of synthetic formation brine containing 10,000 parts per million total dissolved solids (ppm TDS). A typical run began by cleaning the sand by steamflooding, followed by the injection of brine, isopropyl alcohol (IPA), toluene, IPA, and formation brine. The sandpack was then oil flooded to irreducible water saturation (Swir) and initial oil saturation (Soi). At that point the sandpack was steamflooded at a rate of 14 cc/min. (cold water equivalent basis) until steam breakthrough. At that point steam injection was stopped and 100 cc of liquid containing the desired concentration of surfactant or surfactant-additive mixture. Then nitrogen injection at a rate of 120 standard cc/min was started, steam injection was resumed, and surfactant injection was continued. Fluids produced and pressure drop along the pack were measured throughout the run. If the surfactant is a strong foamer, then its injection with steam and nitrogen will result in high pressure drop along the pack. The pressure drop was used to calculate the flow resistance of the foam, where flow resistance is defined as: flow resistance = Pressure Drop with foam/Pressure drop with steam.

Figure 3:
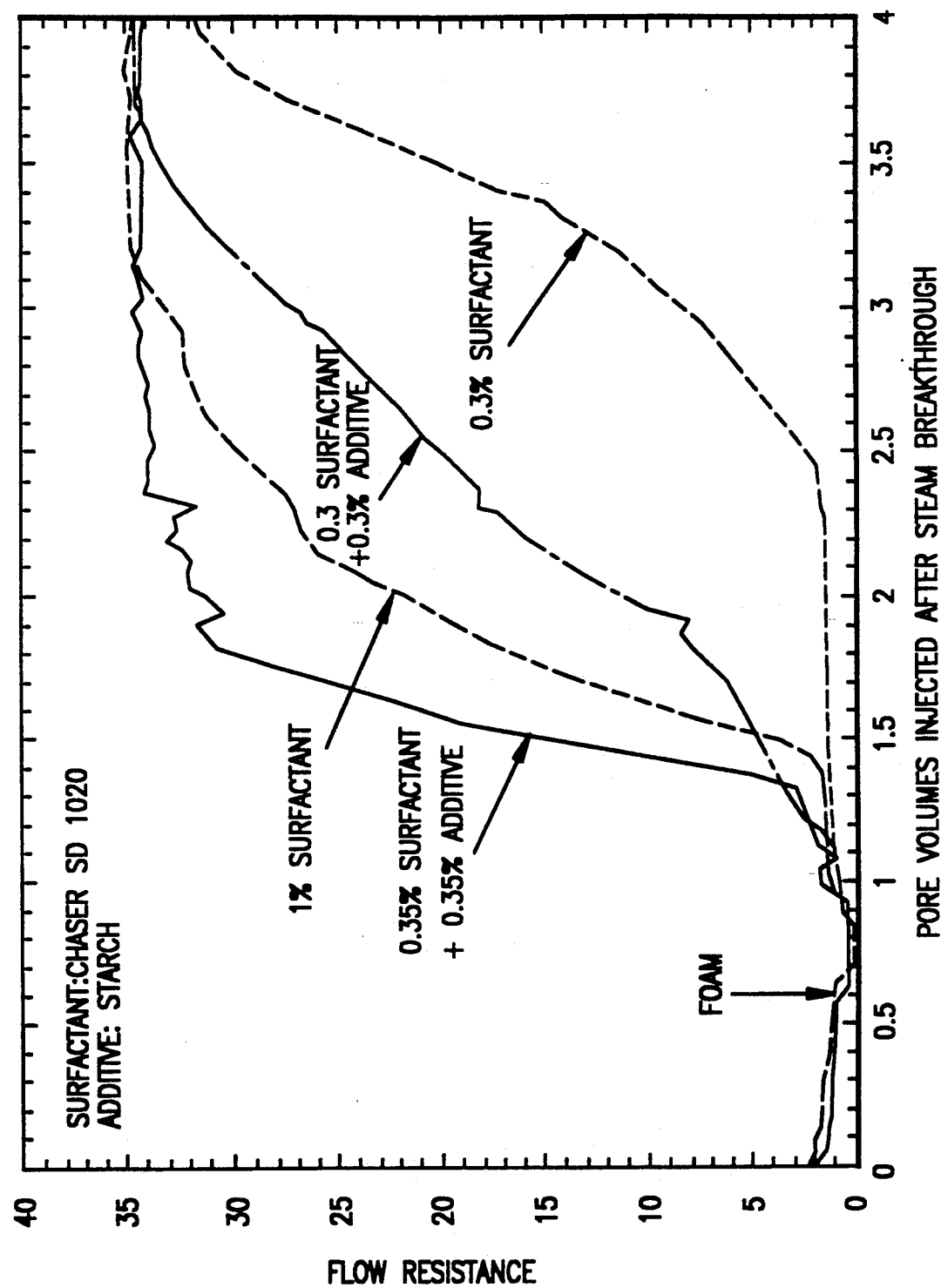
FIG. 3 shows the flow resistance along a sand pack as various quantities of foam forming mixtures flow through the pack.

Linear toluene sulfonate surfactants are widely used in steamfoam field operations. One such surfactant is marketed by Chevron Chemical Company as "CHASER SD1020". It has an average carbon chain-length between 20–24 with very narrow molecular weight distribution. When 1% by weight active "SD1020" is used in the experiment it increases flow resistance to 35 within a short period of time (response time), as shown in FIG. 3.

In another experiment, a lower concentration of "SD1020" was used (0.3% by weight active). As shown in FIG. 3, the lower concentration resulted in the production of weaker foam and a longer response time.

In yet another experiment, the same 0.3% "SD1020" solution also contained 0.3% corn starch additive. It is clearly indicated in FIG. 3 by the higher flow resistance and the quicker response time that the 0.3% starch restored some of the foaming characteristics which were lost due to the lower SD concentration.

The most significant increase in flow resistance and reduction in response time is shown when both the surfactant and the starch concentrations were increased to 0.35% by weight. Again as shown in FIG. 3, the foaming characteristics of this mixture are better than those of "SD1020" at 1% by weight active. This means that 0.35% starch allows the reduction of the concentration of the more expensive surfactant may be reduced to nearly one third its original value resulting in significant reduction in cost and a slight improvement in performance.

EXAMPLE 2

This example is used to demonstrate that the flow diversion ability of the 0.35% "SD1020" + 0.35% starch is equivalent to that of the 1% "SD1020". In this example, the sandpack is 3 ft. long × 1.73 in diameter. The tube is packed with sand of different permeabilities (i.e. 19 darcies on side 1 and 2.5 darcies on side 2). The fluids are injected through the inlet, located in the middle of the pack and are produced from the outlets, on both sides of the pack. Initially the sandpack contained 475 cc California heavy oil and 55 cc of synthetic formation brine.

Figure 4:
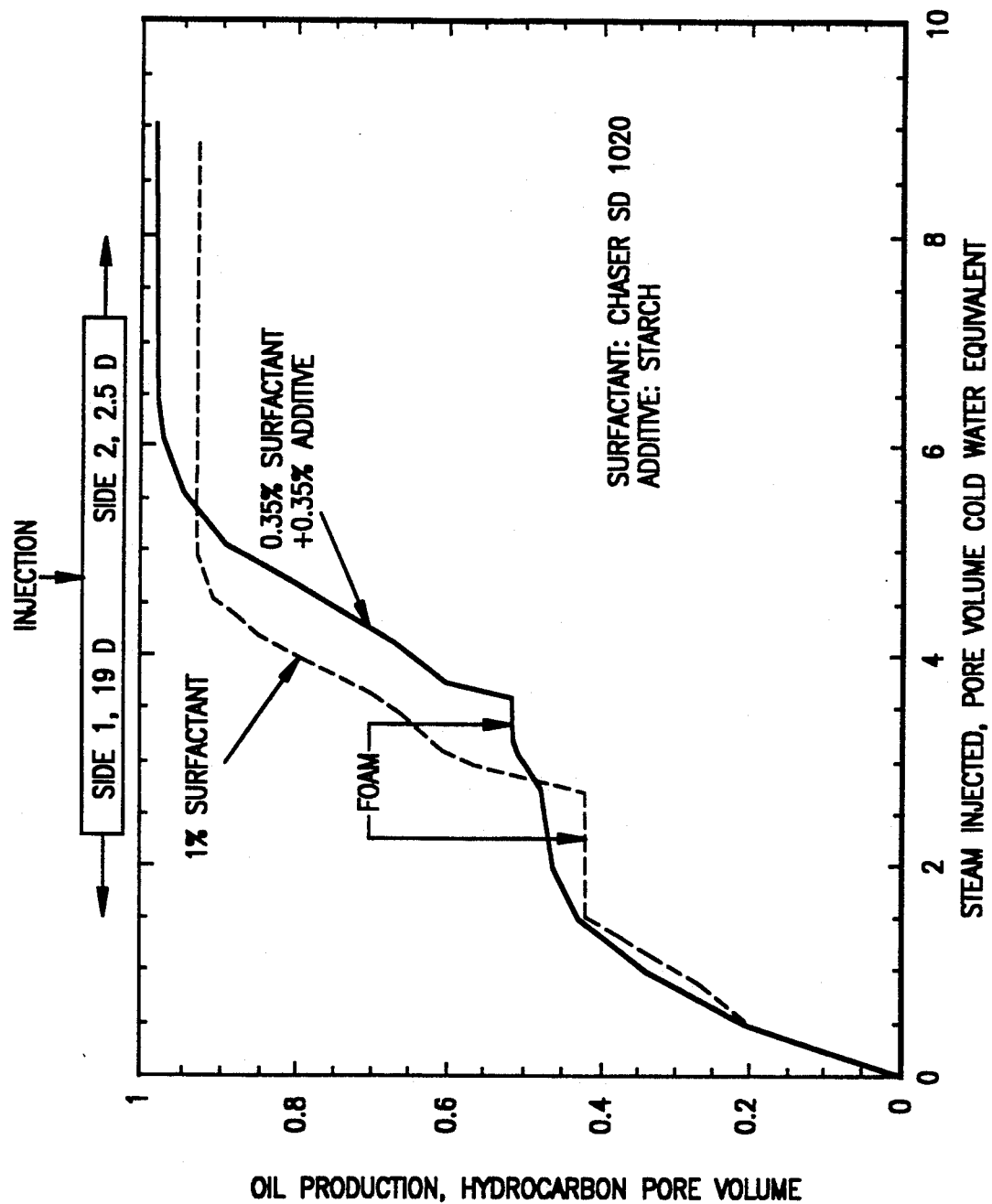
FIG. 4 shows the amount of oil produced from a sand pack during injections of steam-foam-forming mixtures into and through the sand pack.

Initially steam was injected at a rate of 8.5 cc/min. CWEB, and allowed to follow its path resulting in the production of oil from the more permeable side. Steam injection was continued until it broke through from the more permeable side, and no significant oil production was observed (FIG. 4). At that point, steam injection was stopped temporarily and 50 cc. of brine containing 1% by weight active "SD1020" was injected. Then nitrogen was injected at 120 standard cc/min. steam injection was resumed, and surfactant injection was continued. This resulted in the generation of foam in the more permeable side and the diversion of steam to the less permeable side increasing oil production from 42% to 92% of the hydrocarbon pore volume. It is important to note that foam was also generated in the less permeable side but the high oil saturation rendered the foam weaker and ineffective.

This experiment was repeated with 0.35% "SD1020" + 0.35% starch. The results, also shown in FIG. 4, demonstrate that the foam generated by the surfactant-additive mixture was as effective as the 1% surfactant solution by increasing oil production from 51% to 98% of the hydrocarbon pore volume.

As shown above, the steam-foam-forming surfactant/starch mixture of the present invention produces stronger and more economical foams.

By the term "pore volume" as used herein, is meant that the volume of the portion of the formation underlying the well pattern employed as described in greater detail in U.S. Pat. 3,927,716" to Burdyn et al, the disclosure of which is hereby incorporated by reference.

While the invention has been described in terms of a single injection well and a single spaced apart production well, the method according to the invention may be practiced using a variety of well patterns. Any other number of wells, which may be arranged according to any pattern, may be applied in using the present method as illustrated in U.S. Pat. No. 3,927,716 to Burdyn et al.

From the foregoing specification one skilled in the art can readily ascertain the essential features of this invention and without departing from the spirit and scope thereof can adapt it to various diverse applications. It is our intention and desire that our invention be limited only by those restrictions or limitations as are contained in the claims appended immediately herein after below.

What is claimed is:

1. A method for recovering oil from a subterranean, oil-containing formation penetrated by at least one injection well and at least one spaced-apart production well, said wells being in fluid communication with a substantial portion of the formation, comprising:
   (a) injecting steam into the formation and producing fluids including oil from the formation via the production well for a predetermined period of time, thereby forming a steam-swept zone in the formation;
   (b) thereafter injecting a mixture of steam, a noncondensible gas, and an aqueous surfactant-starch solution into the formation via the injection well, said aqueous surfactant-starch solution capable of forming a stable foam in the steam-swept zone at formation conditions of temperature and pressure thereby significantly decreasing the permeability of that zone and diverting the steam, into other portions of the formation; and (c) continuing to inject said mixture of steam, noncondensible gas and aqueous surfactant-starch solution and recovering fluids including oil from the formation via the production well.

2. The method of claim 1 wherein step (a) is continued until steam condensate appears at the production well.

3. The method of claim 1 wherein step (a) is continued until vapor phase steam appears at the production well.

4. The method of claim 1 wherein the concentration of surfactant in the mixture is about 0.1% to about 5% by weight of the liquid phase of the steam (cold water equivalent).

5. The method of claim 1 wherein the concentration of surfactant in the mixture is about 0.35% by weight of the liquid phase of the steam (cold water equivalent).

6. The method of claim 1 wherein the noncondensible gas is selected from the group consisting of nitrogen, carbon dioxide, flue gas, natural gas, methane, ethane, carbon dioxide, or any mixture thereof.

7. The method of claim 1 wherein the amount of noncondensible gas injected is about 40 to 60 standard cubic feet per barrel of steam (cold water equivalent).

8. The method of claim 1 wherein the surfactant is selected from the group consisting of linear toluene sulfonates, alkylaryl sulfonates, dialkylaryl sulfonates, alpha olefin sulfonates and dimerized alpha olefin sulfonates.

9. The method of claim 1 wherein the starch comprises corn starch.

10. The method of claim 1 wherein the surfactant comprises linear toluene sulfonates.

11. The method of claim 1 wherein the starch is selected from the group consisting of corn starch, arrowroot starch, tapioca starch, sago starch, potato starch, pre-oxidized corn starch, rice starch and wheat starch.

12. The method of claim 1 wherein said mixture is injected into an injection well after the establishment of thermal communication between the injection well and the production well.

13. The method of claim 1 further comprising the injection of steam into the injection well after injection of the mixture of steam, noncondensible gas, and aqueous surfactant-starch solution.

14. A method for recovering oil from a subterranean, oil-containing formation penetrated by at least one injection well and at least one spaced-apart production well, said wells being in fluid communication with a substantial portion of the formation, comprising:
   (a) injecting steam into the formation and producing fluids including oil from the formation via the production well for a predetermined period of time, thereby forming a steam-swept zone in the formation;
   (b) thereafter injecting a mixture of a noncondensible gas and an aqueous surfactant-starch solution into the formation via the injection well, said surfactant-starch mixture capable of forming a stable foam with residual oil in the steam-swept zone at formation conditions of temperature and pressure thereby significantly decreasing the permeability of that zone and diverting the steam, non-condensible gas, into other portions of the formation; and
   (c) injecting steam into the injection well and recovering fluids including oil from the formation via the production well.

15. The method of claim 14 wherein step (a) is continued until steam condensate appears at the production well.

16. The method of claim 14 wherein step (a) is continued until vapor phase steam appears at the production well.

17. The method of claim 14 wherein the concentration of surfactant in the mixture is about 0.35% by weight of the liquid phase of the steam (cold water equivalent).

18. The method of claim 14 wherein the noncondensible gas is selected from the group consisting of nitrogen, carbon dioxide, flue gas, natural gas, methane, ethane, carbon dioxide, or any mixture thereof.

19. The method of claim 14 wherein the surfactant is selected from the group consisting of linear toluene sulfonates, alkylaryl sulfonates, dialkylaryl sulfonates, alpha olefin sulfonates and dimerized alpha olefin sulfonates.

20. The method of claim 14 wherein the starch comprises corn starch.

21. The method of claim 14 wherein the surfactant comprise linear toluene sulfonates.

22. The method of claim 14 wherein the amount of noncondensible gas injected is about 40 to 60 standard cubic feet per barrel of steam (cold water equivalent).

23. The method of claim 14 wherein the starch is selected from the group consisting of corn starch, arrowroot starch, tapioca starch, sago starch, potato starch, pre-oxidized corn starch, rice starch and wheat starch.

24. The method of claim 14 wherein said mixture is injected into an injection well immediately prior to steam breakthrough at a production well.

25. A method for recovering oil from a subterranean, oil-containing formation penetrated by at least one injection well and at least one spaced-apart production well, said wells being in fluid communication with a substantial portion of the formation, comprising:
   (a) injecting carbon dioxide into the formation and producing fluids including oil from the formation via the production well for a predetermined period of time, thereby forming a carbon dioxide-swept zone in the formation;
   (b) thereafter injecting a mixture of carbon dioxide and an aqueous surfactant-starch solution into the formation via the injection well, said aqueous surfactant-starch solution capable of forming a stable foam with residual oil in the carbon dioxide-swept zone at formation conditions of temperature and pressure thereby significantly decreasing the permeability of that zone and diverting the carbon dioxide, noncondensible gas, into other portions of the formation; and
   (c) continuing to inject said mixture of carbon dioxide and aqueous surfactant-starch solution and recovering fluids including oil from the formation via the production well.

26. The method of claim 25 wherein step (a) is continued until carbon dioxide appears at the production well.

27. The method of claim 25 wherein the concentration of surfactant in the mixture is about 0.1% to about 5% by weight of the surfactant solution.

28. The method of claim 25 wherein the concentration of surfactant in the mixture is about 0.35% by weight of the surfactant solution.

29. The method of claim 25 wherein the surfactant is selected from the group consisting of linear toluene sulfonates, alkylaryl sulfonates, dialkylaryl sulfonates, alpha olefin sulfonates and dimerized alpha olefin sulfonates.

30. The method of claim 25 wherein the starch comprises corn starch.

31. The method of claim 25 wherein the surfactant comprises linear toluene sulfonates.

32. The method of claim 25 wherein the starch is selected from the group consisting of corn starch, arrowroot starch, tapioca starch, sago starch, potato starch, pre-oxidized corn starch, rice starch and wheat starch.

33. The method of claim 25 wherein said mixture is injected into an injection well immediately prior to carbon dioxide breakthrough at a production well.

34. The method of claim 25 further comprising the injection of carbon dioxide into the injection well after injection of the mixture of carbon dioxide and aqueous surfactant-starch solution.

35. In a steamflood in a subterranean, oil-containing formation, the improvement which comprises:
   (a) injecting into an injection well a mixture of steam, a noncondensible gas and an aqueous surfactant-starch solution which will foam and reduces the permeability of swept zones, forcing steam into unswept areas of the formation; and
   (b) injecting steam into the injection well.

36. The method of claim 35 wherein the concentration of surfactant in the mixture is about 0.1% to about 5% by weight of the liquid phase of the steam (cold water equivalent).

37. The method of claim 35 wherein the concentration of surfactant in the mixture is about 0.35% by weight of the liquid phase of the steam (cold water equivalent).

38. The method of claim 35 wherein the noncondensible gas is selected from the group consisting of nitrogen, carbon dioxide, flue gas, natural gas, methane, ethane, carbon dioxide, or any mixture thereof.

39. The method of claim 36 wherein the surfactant is selected from the group consisting of linear toluene sulfonates, alkylaryl sulfonates, dialkylaryl sulfonates, alpha olefin sulfonates and dimerized, alpha olefin sulfonates.

40. The method of claim 35 wherein the starch comprises corn starch.

41. The method of claim 35 wherein the surfactant comprises linear toluene sulfonates.

42. The method of claim 35 wherein the amount of noncondensible gas injected is about 40 to 60 standard cubic feet per barrel of steam (cold water equivalent).

43. The method of claim 35 wherein the starch is selected from the group consisting of corn starch, arrowroot starch, tapioca starch, sago starch, potato starch, pre-oxidized corn starch, rice starch and wheat starch.

44. In a carbon dioxide flood in a subterranean, viscous oil-containing formation, the improvement which comprises:
   (a) injecting into an injection well a mixture of carbon dioxide and an aqueous surfactant-starch solution which will foam and reduce the permeability of swept zones, forcing carbon dioxide into unswept areas of the formation; and
   (b) injecting carbon dioxide into the injection well.

45. The method of claim 44 wherein the concentration of surfactant in the mixture is about 0.1% to about 5% by weight of aqueous surfactant solution.

46. The method of claim 44 wherein the concentration of surfactant in the mixture is about 0.35% by weight of the aqueous surfactant solution.

47. The method of claim 44 wherein the surfactant is selected from the group consisting of sodium or ammonium salts of ethoxylated sulfated alcohols and linear alcohol ethoxylates.

48. The method of claim 44 wherein the starch comprises corn starch.

49. The method of claim 44 wherein the surfactant comprises ammonium salts of ethoxylated sulfated alcohol.

50. The method of claim 44 wherein the starch is selected from the group consisting of corn starch, arrowroot starch, tapioca starch, sago starch, potato starch, pre-oxidized corn starch, rice starch and wheat starch.

* * * * *